United States Patent [19]

Michel et al.

[11] Patent Number: 4,801,425
[45] Date of Patent: Jan. 31, 1989

[54] NUCLEAR POWER PLANT HAVING A METALLIC REACTOR PRESSURE VESSEL

[75] Inventors: Eberhard Michel, Nürnberg; Manfred Scholz; Wolfgang Berndt, both of Erlangen; Peter Kätscher, Langensendelbach, all of Fed. Rep. of Germany

[73] Assignee: Siemens Aktiengesellschaft, Berlin and Munich, Fed. Rep. of Germany

[21] Appl. No.: 77,587

[22] Filed: Jul. 24, 1987

[30] Foreign Application Priority Data

Jul. 28, 1986 [DE] Fed. Rep. of Germany ....... 3625436

[51] Int. Cl.⁴ .......................... G21C 1/08; G21C 13/02
[52] U.S. Cl. .................................... 376/461; 376/285; 376/292
[58] Field of Search ................. 376/285, 291, 292, 461

[56] References Cited

U.S. PATENT DOCUMENTS

| | | | |
|---|---|---|---|
| 3,916,944 | 11/1975 | Crawford et al. | 376/461 |
| 4,028,176 | 6/1977 | Kraupa | 376/293 |
| 4,600,553 | 7/1986 | Katz et al. | 376/292 |

FOREIGN PATENT DOCUMENTS

| | | |
|---|---|---|
| 2445225 | 9/1976 | Fed. Rep. of Germany . |
| 2850651 | 6/1980 | Fed. Rep. of Germany . |
| 2916951 | 11/1980 | Fed. Rep. of Germany . |
| 2285684 | 4/1976 | France . |
| 2455694 | 11/1980 | France . |
| 2525378 | 10/1983 | France . |

Primary Examiner—Harold J. Tudor
Assistant Examiner—Richard W. Wendtland
Attorney, Agent, or Firm—Herbert L. Lerner; Laurence A. Greenberg

[57] ABSTRACT

A nuclear power plant includes a concrete biological shield, a metallic reactor pressure vessel surrounded by the concrete biological shield, coolant connector pieces connected to the reactor pressure vessel, coolant lines connected to the coolant connector piece, and a support engaging the coolant connector pieces and holding the reactor pressure vessel. The support includes at least one supporting tube surrounding one of the coolant connector pieces, the supporting tube having an inner surface anchored on the one coolant connector piece and an outer surface anchored on the biological shield.

7 Claims, 2 Drawing Sheets

NUCLEAR POWER PLANT HAVING A METALLIC REACTOR PRESSURE VESSEL

The invention relates to a nuclear power plant having a metallic reactor pressure vessel, which has coolant connector pieces for the connection of coolant lines and is surrounded by a concrete biological shield, the reactor pressure vessel being retained with a support engaging the coolant connector piece.

In the support known from German published, prosecuted Application DE-AS No. 24 45 225, the coolant connector pieces rest on a supporting ring formed of partial segments, which is secured in the biological shield against lifting by means of anchoring screws. No lateral fixation of the coolant connector pieces can be found.

It is accordingly an object of the invention to provide a nuclear power plant having a metallic reactor pressure vessel, which overcomes the hereinafore-mentioned disadvantages of the heretofore-known devices of this general type and to construct the support without a supporting ring surrounding the entire reactor pressure vessel, yet nevertheless to assure that lateral forces can also be absorbed.

With the foregoing and other objects in view there is provided, in accordance with the invention, a nuclear power plant, comprising a concrete biological shield, a metallic reactor pressure vessel surrounded by the concrete biological shield, coolant connector pieces connected to the reactor pressure vessel, coolant lines connected to the coolant connector pieces, and a support engaging the coolant connector pieces and holding the reactor pressure vessel, the support including at least one supporting tube surrounding one of the coolant connector pieces, the supporting tube having an inner surface anchored on the one coolant connector piece and an outer surface anchored on the biological shield.

In the support according to the invention, all forces are removed directly into the concrete of the biological shield through the supporting tube. However, since the supporting tube is a small and lightweight component in comparison with a conventional supporting ring, it can be aligned and mounted accurately with respect to the coolant connector piece and the biological shield. The result is a flow of force that can be unequivocally monitored even in the event of radial and axial thermal expansions of the supporting tube and of the reactor pressure vessel with its coolant connector pieces. The reactor pressure vessel is then held in the desired central and axial location in all operating states.

In accordance with another feature of the invention, the supporting tube is at least partially anchored in a form-locking manner by dogs locked into recesses. A form-locking connection is one which is connects two elements together due to the shape of the elements themselves, as opposed to a force-locking connection, which locks the elements together by force external to the elements. The dogs are protrusions that protrude into recesses, so that there is the possibility of motion in the longitudinal direction of the recesses.

In accordance with a further feature of the invention, the dogs have a play of from 0.1 to 0.5 mm in the recesses. An equivalent embodiment may also be provided on the outside of the supporting tube, but it would be located where the supporting tube is anchored in the biological shield. At that location, corresponding anchoring plates are used for carrying the forces into the concrete.

In accordance with an added feature of the invention, the supporting tube is cylindrical and includes two sets of dogs for holding the supporting tube, the sets being disposed at two positions along the longitudinal axis of the supporting tube, and each of the sets including four dogs mutually offset by 90°. This kind of symmetrical embodiment is particularly insensitive to thermal expansions.

In accordance with an additional feature of the invention, the concrete biological shield has a wall with opposite sides, and including two preferably square support plates each being secured on a respective one of the opposite sides of the wall, the support plates each having recesses formed therein receiving the dogs for securing the supporting tube.

In accordance with yet another feature of the invention, there are provided tension screws joining the support plates together. Joining the support plates with tension screws results in a stable construction in which the concrete is predominantly subjected to compressive strains. Thrust forces can be transferred to the concrete by dowels that are secured to the support plates, or by similar elements.

In accordance with yet a further feature of the invention, there is provided a heat insulator mounted on the supporting tube. The heat insulator is used in order to reduce the conduction of heat into the concrete of the biological shield.

In accordance with yet an added feature of the invention, there is provided a sealing ring secured to the inner surface of the supporting tube and extending to the outer periphery of the coolant connector piece. With such a sealing ring, an undesirable passage of gases or vapors through the intervening space between the supporting tube and the coolant connector piece can be limited to orders of magnitude suitable for the structure.

In accordance with a concomitant feature of the invention, the coolant connector pieces are each connected to a coolant loop of a pressurized water reactor and each of the coolant connector pieces has a respective one of the supporting tubes secured thereto. In principle, a supporting tube on a single coolant connector piece is adequate for the aforementioned absorption of lateral forces. However, since a plurality of coolant loops with inlet and outlet lines are typically connected to reactor pressure vessels, the forces can advantageously be distributed to a plurality of supporting tubes. Especially in the case of a pressurized water reactor, all of the coolant connector pieces should be provided with a supporting tube.

Other features which are considered as characteristic for the invention are set forth in the appended claims.

Although the invention is illustrated and described herein as embodied in a nuclear power plant having a metallic reactor pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
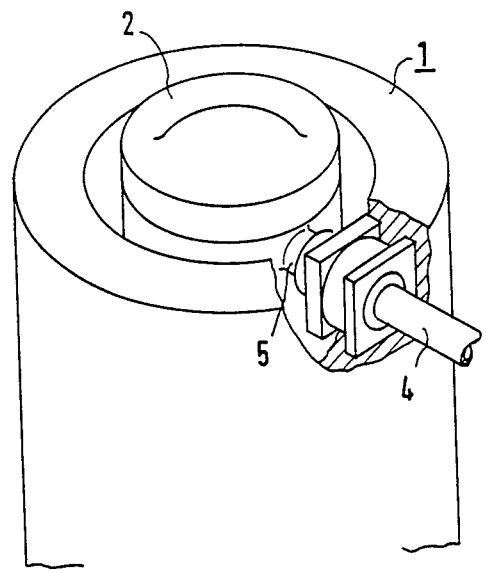
FIG. 1 is a fragmentary, diagrammatic, partly broken-away perspective view of the device as a whole.

Referring now to the figures of the drawings in detail and first, particularly, to FIG. 1 thereof, there is seen a simplified view of a biological shield 1 made of concrete, which is part of a nuclear power plant having a pressurized water reactor. The biological shield surrounds a reactor pressure vessel 2 and serves as a radiation shield. As is well known, the reactor pressure vessel 2 is a thick-walled metal vessel having a wall thickness of 20 cm, for example, in which the core of the reactor, formed of fuel assemblies is disposed, so that its total weight is 600 tons or more. The heat generated in the core is carried away by means of pressurized water. The water serves as a primary coolant and is guided through coolant loops, such as three in number, with non-illustrated vapor generators and coolant pumps. The three coolant loops include six coolant lines 4 which extend through the biological shield 1. The coolant lines 4 discharge into coolant connector pieces 5, which are joined to the reactor pressure vessel. The reactor pressure vessel 2 is held with the same support 7 shown in FIG. 3 at all six coolant connector pieces 5.

Figure 2:
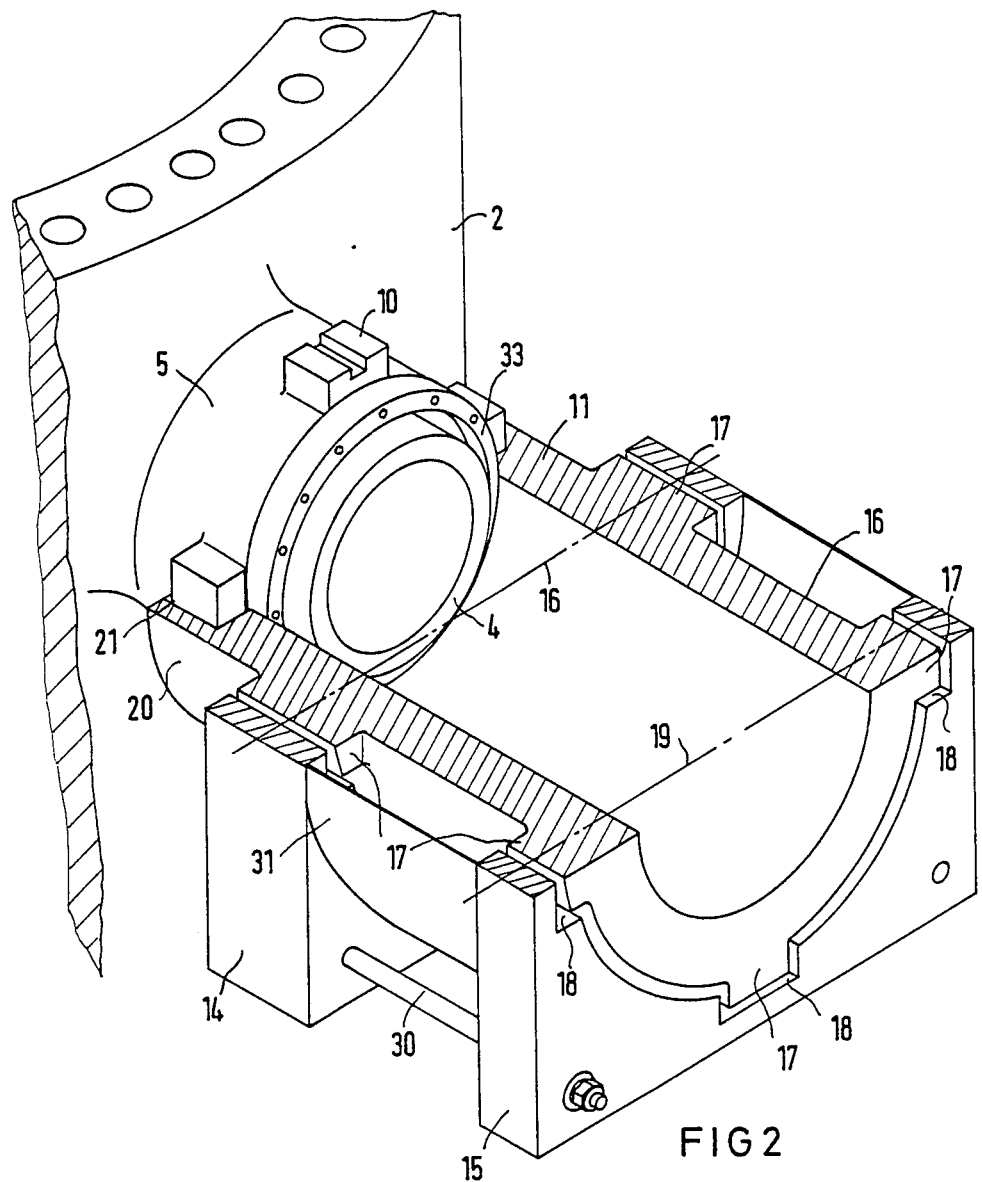
FIG. 2 is an enlarged, partly cross-sectional perspective view of a portion of FIG. 1.

FIG. 2 shows one of the coolant connector pieces 5 mounted on the reactor pressure vessel 2 from which a coolant line 4 extends. It is apparent that the coolant connector piece 5 which has a wall thickness of approximately 20 cm, is more than three times as thick as the coolant line 4, which has a wall thickness of approximately 6 cm. Protruding beyond the outer diameter of the coolant connector piece 5 which is 120 cm wide, are four dogs 10 that are mutually offset by 90°. Each of the dogs protrudes 13 cm in the vertical and horizontal directions and is 30 cm wide. A cylindrical supporting tube 11 which engages the dogs 10, has a wall thickness of 22 cm and in turn is held in two square plates 14 and 15 acting as counter supports.

Once again, two sets of four dogs 17 which are mutually offset by 90° on the outer surface 16 of the supporting tube 11, are engaged recesses 18 in the plates 14 and 15, so that lateral forces are absorbed. The dogs 17 are located at two positions 19, 29 along the longitudinal axis of the supporting tube 11 which are mutually offset by approximately the diameter of the supporting tube and which extend symmetrically in the vertical and horizontal directions. The dogs 17 have practically the same dimensions as the dogs 10 of the supporting tube 11 which engage recesses 21 that are provided in an inner surface 22 of an end 20 of the supporting tube 11 oriented toward the reactor pressure vessel 2. In the recesses 21, the reactor pressure vessel 2 is supported by the coolant connector pieces 5 with the dogs 10. The spacing between the dogs 10 and the dogs 17 oriented toward the dogs 10 is only approximately one-half as large as the spacing between positions 16 and 17.

It is also apparent from FIG. 2 that the plates 14 and 15 are joined with tension screws 30, which can be initially tightened against a spacer tube 31. After performing a concrete embedding operation, in which the intervening space between the plates 14 and 15 outside the spacer tube 31 is filled with concrete, a compressive force can be brought to bear upon the concrete by subsequently tightening the tension screws 30.

FIG. 2 also shows that the end of the supporting tube 11 oriented toward the coolant connector piece 5, carries a sealing ring 33 acting as a seal, which can be screwed onto the end surface of the coolant connector piece. The sealing ring 33 closes off the free intervening space between the coolant connector piece 5 and the supporting tube 11 in the best possible way.

Figure 3:
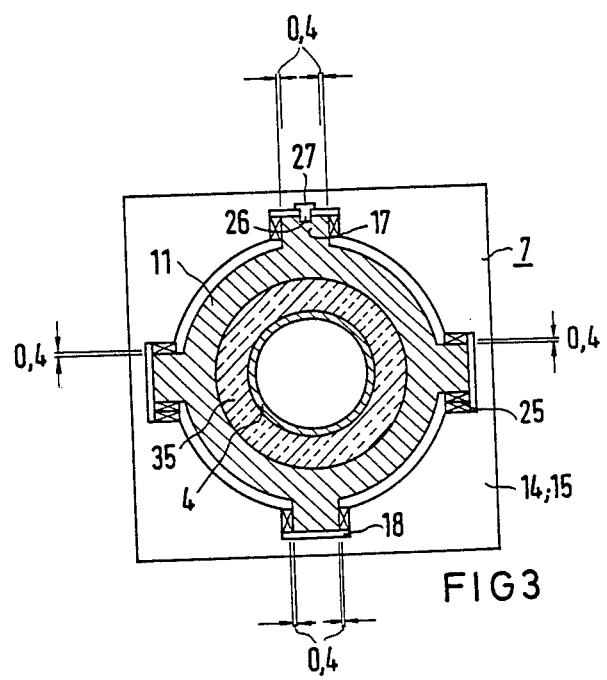
FIG. 3 is a cross-sectional view of a coolant connector piece at right angles to the longitudinal axis thereof.

FIG. 3 shows that a play of approximately 0.4 mm is provided between the supporting tube 11 with its dogs 17 and the corresponding recesses 18 in the plates 14 and 15, which is sufficient for absorbing thermal expansions. The dogs 17 extending in the horizontal direction on the supporting tube 11 are also intercepted by bearing plates 25. A groove 26 is provided in the uppermost dog 17. The groove is engaged by a key 27, in order to obtain exact guidance without hindering longitudinal expansions of the coolant connector piece 5 or coolant line 4.

It is also apparent from FIG. 3 that a heat insulator 35 is provided in the annular gap between the coolant line 4 and the supporting tube 11. The heat insulator 35 lessens the conduction of heat from the coolant line 4 through the supporting tube 11 into the concrete of the biological shield 1.

The foregoing is a description corresponding in substance to German Application No. P 36 25 436.3, dated July 28, 1986, the International priority of which is being claimed for the instant application, and which is hereby made part of this application. Any material discrepancies between the foregoing specification and the aforementioned corresponding German application are to be resolved in favor of the latter.

We claim:

1. Nuclear power plant, comprising a concrete biological shield having a wall with opposite sides, a metallic reactor pressure vessel surrounded by said concrete biological shield, coolant connector pieces connected to said reactor pressure vessel, coolant lines connected to said coolant connector pieces, a support engaging said coolant connector pieces and holding said reactor pressure vessel, said support including at least one supporting tube surrounding one of said coolant connector pieces, said supporting tube being cylindrical and having an inner surface anchored on said one coolant connector piece, an outer surface anchored on said biological shield, and two sets of dogs for holding said supporting tube, said sets being disposed at two positions along the longitudinal axis of said supporting tube, each of said sets including four dogs mutually offset by 90°, and two support plates each being secured on a respective one of said opposite sides of said wall, said support plates each having recesses formed therein receiving said dogs for securing said supporting tube.

2. Nuclear power plant according to claim 1, wherein said dogs have a play of from 0.1 to 0.5 mm in said recesses.

3. Nuclear power plant according to claim 1, wherein said support plates have a square profile.

4. Nuclear power plant according to claim 1, including tension screws joining said support plates together.

5. Nuclear power plant according to claim 1, including a heat insulator mounted on said supporting tube.

6. Nuclear power plant according to claim 1, including a sealing ring secured to said inner surface of said supporting tube and extending to the outer periphery of said coolant connector piece.

7. Nuclear power plant according to claim 1, wherein said coolant connector pieces are each connected to a coolant loop of a pressurized water reactor and each of said coolant connector pieces has a respective one of said supporting tubes secured thereto.

* * * * *